UNITED STATES PATENT OFFICE.

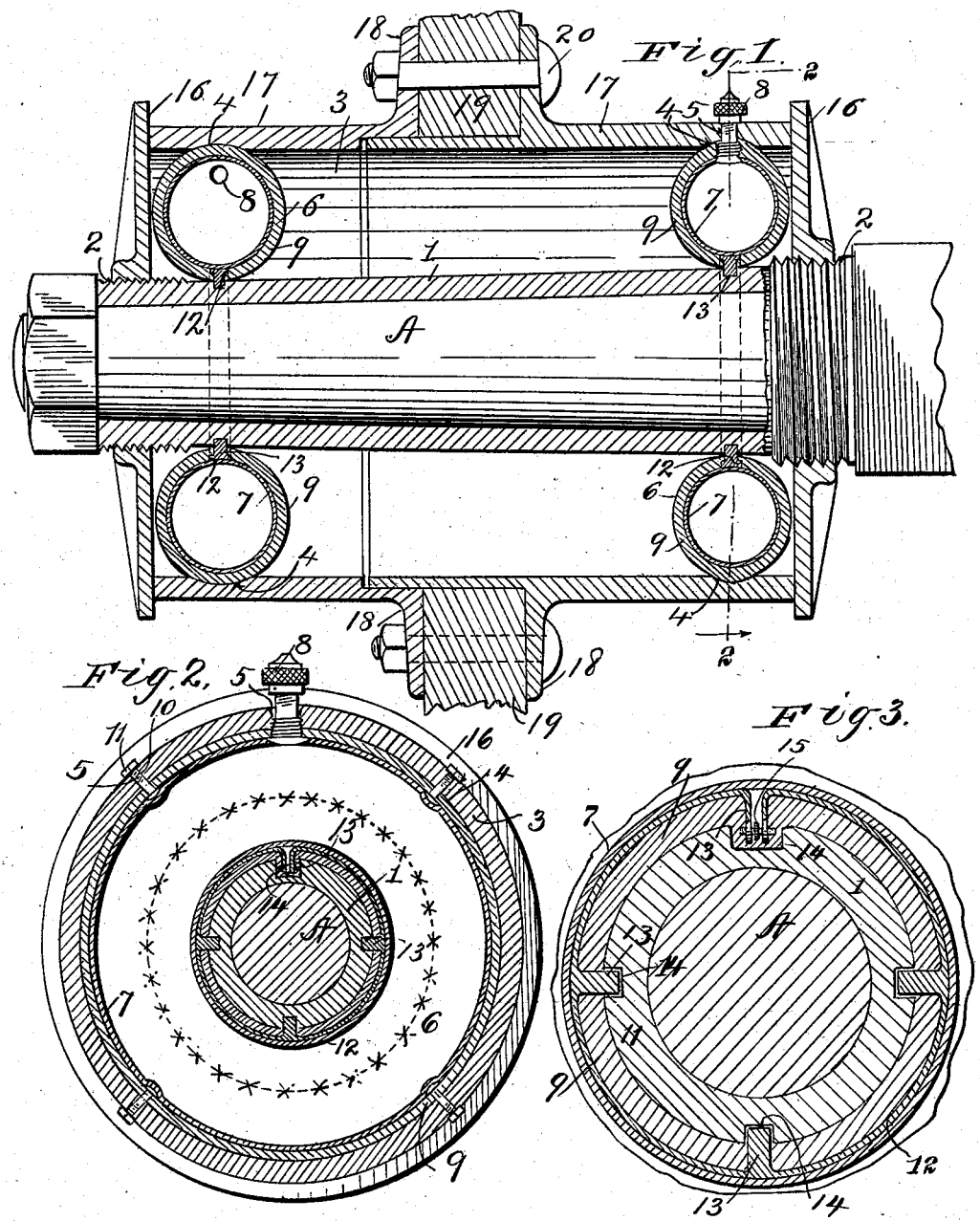

JAMES E. McQUILKIN, OF WESTMORELAND COUNTY, PENNSYLVANIA.

RESILIENT WHEEL.

No. 899,425.      Specification of Letters Patent.      Patented Sept. 22, 1908.

Application filed February 4, 1908. Serial No. 414,230.

*To all whom it may concern:*

Be it known that I, JAMES E. McQUILKIN, a citizen of the United States, residing in the county of Westmoreland, near Apollo, Armstrong county, and State of Pennsylvania, have invented certain new and useful Improvements in Resilient Wheels, of which the following is a specification.

The object of this invention is an improved resilient wheel for vehicles that is designed to supercede the ordinary pneumatic-tired wheel in which the tire is subject to abrasion, puncture and the like, and that consists of comparatively few parts which may be readily separated when desired to permit repairs or the like to be quickly effected.

With these and other objects in view that will more fully appear as the description proceeds, the invention consists in certain constructions and arrangements of parts that I shall hereinafter fully describe and claim.

For a full understanding of the invention and the merits thereof, reference is to be had to the following description and the accompanying drawing, in which:

Figure 1 is a longitudinal section of the hub and boxing of my improved resilient wheel; Fig. 2 is a transverse section thereof on the line 2—2 of Fig. 1; and, Fig. 3 is a similar view of the inner portion on an enlarged scale.

Corresponding and like parts are referred to in the following description and indicated in all the views of the drawing by the same reference characters.

My improved wheel is designed to be mounted on the spindle A of an axle, and embodies a boxing 1 journaled on said spindle and having its ends exteriorly threaded as indicated at 2. A hollow cylindrical hub 3 encircles the entire boxing excepting the threaded ends 2 thereof and is spaced from said boxing as shown, said hub being preferably formed in its inner surface near its opposite ends with annular grooves 4 and in each groove with a plurality of openings 5.

A resilient element is designed to be interposed between the boxing and the hub and in the present instance comprises two pneumatic cushions 6 which fit in the space between the hub and the boxing and which are received in the interior grooves 4. Each cushion 6 comprises an inner or pneumatic tube 7 formed with an inflation valve 8 that projects through one of the openings 5 in the hub and an outer tube 9 incasing the inner tube and provided with a plurality of threaded shanks 10 which extend through the remaining openings 5 and have nuts 11 mounted on their ends, said shanks serving to secure the cushion to the hub.

In order to hold the cushions securely to the boxing and prevent any movement relative thereto, tie-bands 12 are provided within the outer tubes 9 and are formed at their ends and at intervals intermediate of their ends, with lugs 13 which project inwardly through the outer tubes and are received in sockets 14 formed in the periphery of the boxing. Turn-buckles 15 are engaged with the end lugs 13 of the tie-bands in order to hold said ends adjustably together.

Cap-plates 16 are mounted on the threaded ends 2 of the boxing and are designed to be screwed against the respective ends of the hub to prevent dirt from lodging in the space between the latter and the boxing, said cap-plates preferably extending outwardly beyond the hub in order to remain in an operative relation thereto during any vibration or the like of the wheel.

In the preferred construction of the hub, the latter is constructed in two sections 17 the adjacent ends of which have a telescoping connection and are formed with out-turned flanges 18. The inner ends of the spokes 19 are fitted between these flanges and are held rigidly in position to support a suitable rim—by bolts 20 or the like passing through the flanges, said bolts also serving to secure together the two sections of the hub.

From the above description in connection with the accompanying drawing, it will be apparent that I have provided a simple, durable and efficient construction of resilient wheel in which the pneumatic cushion will not be subject to abrasion or the like as is the case with the ordinary rim tire.

Having thus described the invention, what I claim is:

1. In a wheel, the combination of a boxing formed in its periphery with a plurality of sockets, a hub encircling the boxing and spaced therefrom, an annular cushion interposed between the hub and the boxing, a tie band carried by the cushion and formed with inwardly disposed lugs seated in the respective sockets of the boxing to prevent the cushion from rotating relative thereto, and means for rigidly securing the cushion to the hub.

2. A wheel, embodying a boxing formed in its periphery near each end with a plurality of sockets, a hub encircling the boxing and spaced therefrom, said hub being formed near each end with a plurality of openings extending therethrough, cushions interposed between the corresponding ends of the hub and boxing and constructed in inner and outer tubes, a plurality of shanks secured to the outer tubes and projecting through the openings in the hub with nuts mounted on their outer ends, tie-bands provided within the outer tubes and formed with lugs extending therethrough and received in the sockets in the boxing and means for securing together the ends of the tie-bands.

In testimony whereof I affix my signature in presence of two witnesses.

JAMES E. McQUILKIN.    [L. S.]

Witnesses:
    EARLE F. COCHRANE,
    JNO. Q. COCHRANE.